US012608161B2

(12) United States Patent
Kim

(10) Patent No.: US 12,608,161 B2
(45) Date of Patent: Apr. 21, 2026

(54) STORAGE DEVICE AND OPERATING METHOD THEREOF

(71) Applicant: SK hynix Inc., Icheon-si (KR)

(72) Inventor: Jung Woo Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/774,792

(22) Filed: Jul. 16, 2024

(65) Prior Publication Data

US 2025/0291515 A1 Sep. 18, 2025

(30) Foreign Application Priority Data

Mar. 12, 2024 (KR) ........................ 10-2024-0034253

(51) Int. Cl.
G06F 12/02 (2006.01)
G06F 3/06 (2006.01)
G06F 3/08 (2006.01)

(52) U.S. Cl.
CPC ............ G06F 3/0659 (2013.01); G06F 3/061 (2013.01); G06F 3/0673 (2013.01)

(58) Field of Classification Search
CPC ...... G06F 12/0866; G06F 3/061; G06F 3/064; G06F 3/0656; G06F 3/0659; G06F 3/0674
See application file for complete search history.

(56) References Cited

U.S. PATENT DOCUMENTS

| | | | |
|---|---|---|---|
| 2019/0205248 A1* | 7/2019 | Hsieh ..................... | G11C 7/109 |
| 2022/0405199 A1* | 12/2022 | Kanno ............... | G06F 12/0292 |
| 2023/0297247 A1* | 9/2023 | Kanno .................. | G06F 3/0679 |
| | | | 711/154 |
| 2025/0199685 A1* | 6/2025 | Honda .................. | G06F 3/0652 |

FOREIGN PATENT DOCUMENTS

| | | |
|---|---|---|
| KR | 10-2012-0098850 A | 9/2012 |
| KR | 10-2017-0118288 A | 10/2017 |

* cited by examiner

*Primary Examiner* — Yong J Choe

(57) ABSTRACT

A storage device may receive, from a host, one or more write commands for writing a plurality of first data units and a plurality of second data units, obtain a start logical address and a size of each of the plurality of first data units and a start logical address and a size of each of the plurality of second data units from the one or more write commands, and write at least a part of the plurality of first data units and the plurality of second data units to the memory based on the start logical address and the size of each of the plurality of first data units and the start logical address and size of each of the plurality of second data units.

18 Claims, 10 Drawing Sheets

*FIG.7*

| write DU_1 | write DU_2 | write DU_1 | write DU_2 | write DU_1 | write DU_2 | ... | time →

STORAGE DEVICE AND OPERATING METHOD THEREOF

CROSS-REFERENCES TO RELATED APPLICATION

The present application claims priority under 35 U.S.C. 119(a) to Korean patent application number 10-2024-0034253 filed on Mar. 12, 2024, which is incorporated herein by reference in its entirety.

BACKGROUND

1. Technical Field

Various embodiments of the present disclosure generally relate to a storage device that alternately writes a plurality of data units related to each other, and operating method thereof.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (e.g., a host), and execute or control operations to read, write, or erase data in the memory included in the storage device according to the received command.

When receiving a command for writing a relatively large amount of user data from the external device, the controller may sequentially write the user data to the memory. However, due to the structure of the file system used in the external device, it may be necessary to write metadata corresponding to the user data while sequentially writing the user data.

In this case, overhead may occur as the external device alternately instructs the controller to write the metadata and the user data with different characteristics.

SUMMARY

Various embodiments of the present disclosure are directed to providing a storage device capable of minimizing overhead that occurs in the process of alternately writing related data units, and operating method thereof.

In an aspect, a storage device may include: a memory configured to store a plurality of data units; and a controller configured to receive, from a host, one or more write commands for writing a plurality of first data units and a plurality of second data units, obtain a start logical address and a size of each of the plurality of first data units and a start logical address and a size of each of the plurality of second data units from the one or more write commands, and write at least a part of the plurality of first data units and the plurality of second data units to the memory based on the start logical address and the size of each of the plurality of first data units and the start logical address and the size of each of the plurality of second data units obtained from the write commands.

In another aspect, an operating method of a storage device may include receiving, from a host, one or more write commands for writing a plurality of first data units and a plurality of second data units; obtaining a start logical address and a size of each of the plurality of first data units and a start logical address and a size of each of the plurality of second data units from the one or more write commands; and writing at least a part of the plurality of first data units and the plurality of second data units to the memory.

According to the embodiments of the disclosed technology, it is possible to minimize overhead that occurs in the process of alternately writing related data units.

BRIEF DESCRIPTION OF THE DRAWINGS

FIG. 7 is a diagram illustrating an example of an order in which a plurality of first data units and a plurality of second data units are written according to an embodiment of the present disclosure.

DETAILED DESCRIPTION

Figure 1:
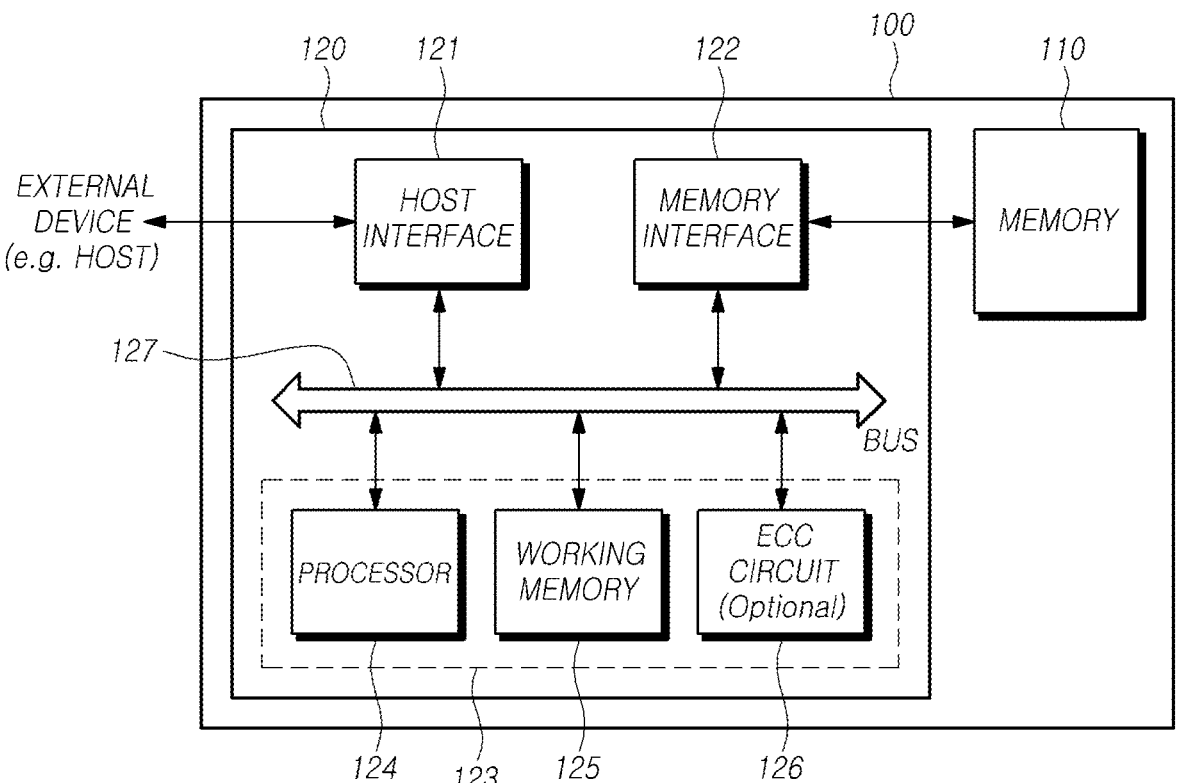
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only a single embodiment, and different references to any such phrase are not necessarily limited to the same embodiment(s).

Various embodiments of the present invention are described below in more detail with reference to the accompanying drawings. However, embodiments of the present disclosure may be implemented in different forms and variations, and should not be construed as being limited to the embodiments set forth herein. Rather, the described embodiments are provided so that this disclosure will be thorough and complete, and will fully convey various embodiments of the present disclosure to those skilled in the art to which this invention pertains. Throughout the disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing devices may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into a single device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include one or both of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into a single component. In addition to the above-described components 121, 122, 124, 125 and 126 of the controller 120, one or more other components may be added.

Hereinbelow, the memory 110 will be described in further detail with reference to FIG. 2.

Figure 2:
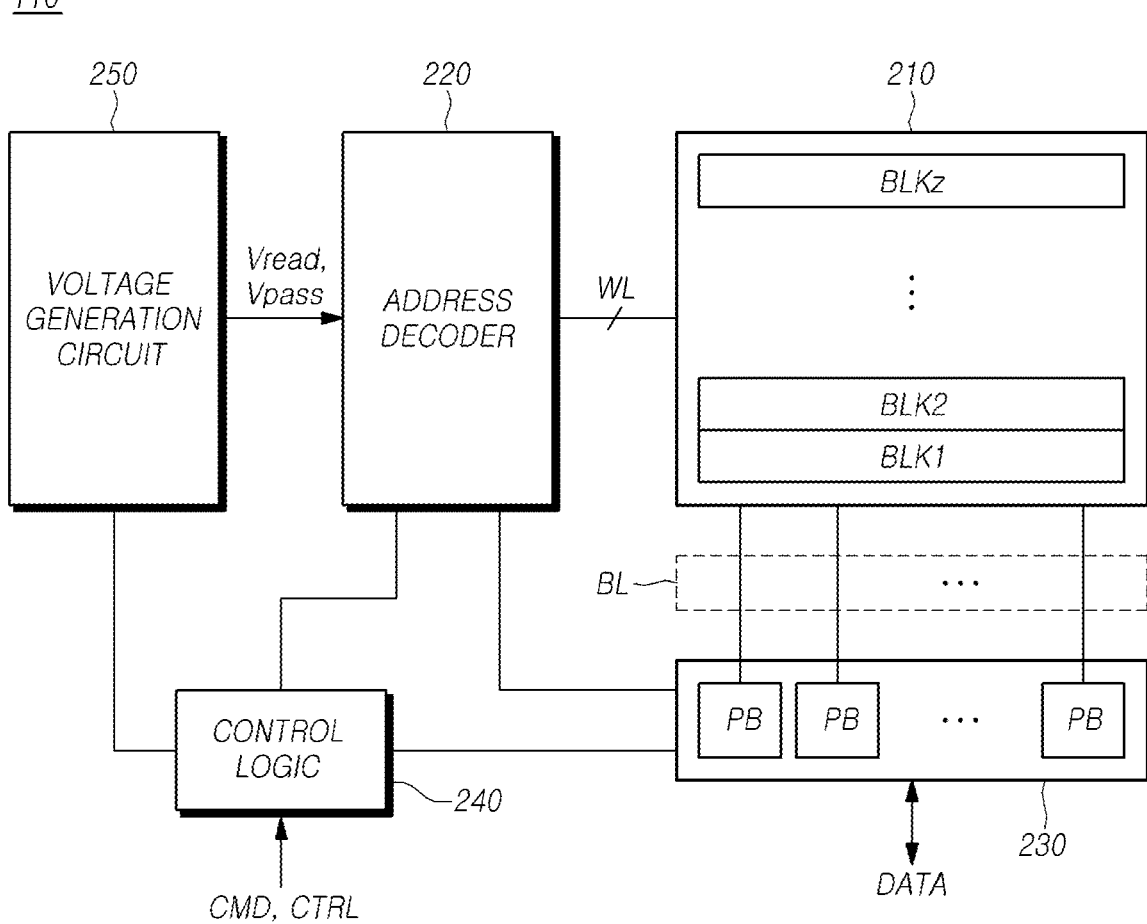
FIG. 2 is a block diagram schematically illustrating a memory of FIG. 1.

FIG. 2 is a block diagram schematically illustrating a memory 110 of FIG. 1 according to an embodiment of the present disclosure.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
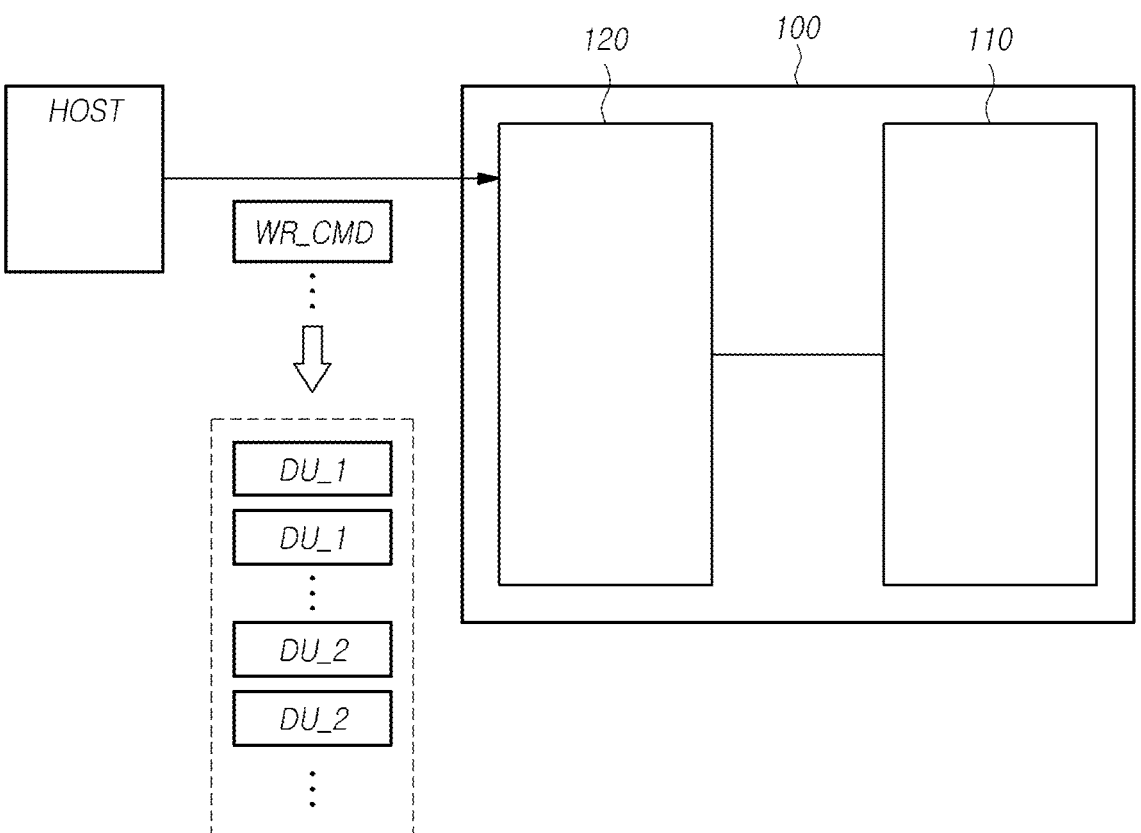
FIG. 3 is a diagram illustrating a schematic operation of a storage device according to an embodiment of the present disclosure.

FIG. 3 is a diagram illustrating a schematic operation of a storage device 100 according to an embodiment of the present disclosure.

Referring to FIG. 3, the storage device 100 may include a memory 110 and a controller 120.

The memory 110 may store a plurality of data units. The memory 110 may include a plurality of memory blocks. Each of the plurality of memory blocks may correspond to a plurality of pages. For example, the size of each of the plurality of data units may be a multiple of the size of the page.

The controller 120 may receive, from a host HOST, one or more write commands WR_CMD for requesting to write a plurality of first data units DU_1 and a plurality of second data unit DU_2. The plurality of first data units DU_1 and the plurality of second data units DU_2 are data units that can be stored in the memory 110, respectively.

The write commands WR_CMD may indicate a write pattern for the plurality of first data units DU_1 and the plurality of second data units DU_2. After receiving the write commands WR_CMD, the controller 120 may obtain a start logical address and a size of each of the plurality of first data units DU_1 and a start logical address and a size of each of the plurality of second data units DU2. Based on this, the controller 120 may write the plurality of first data units DU_1 and the plurality of second data units DU_2 to the memory 110. At this time, the controller 120 may write all or part of the plurality of first data units DU_1 and the plurality of second data units DU_2 to the memory 110.

For example, the controller 120 may read a start logical address and a size of each of the plurality of first data units DU_1 and a start logical address and a size of each of the plurality of second data units DU2, which are included in the one or more write commands WR_CMD.

As another example, the controller 120 may calculate a start logical address and a size of each of the plurality of first data units DU_1 and a start logical address and a size of each of the plurality of second data units DU2, based on a start logical address and a size information of one of the plurality of first data units DU_1 and a start logical address and a size information of one of the plurality of second data units DU_2 included in the write commands WR_CMD. Specifically, the controller 120 may calculate start logical addresses and sizes of the plurality of first data units DU_1 based on a start logical address and a size of a first one of the first data units DU_1, when an interval between consecutive logical addresses of the first data units DU_1 and the size of each of the first data units DU_1 are predetermined (e.g., constant). Similarly, the controller 120 may calculate start logical addresses and sizes of the plurality of second data units DU_2 based on a start logical address and a size of a first one of the second data units DU_2, when an interval between consecutive logical addresses of the second data units DU_2 and the size of each of the second data units DU_2 are predetermined (e.g., constant). In such an example, the size of the one or more write commands WR_CMD may be reduced compared to when the write commands WR_CMD includes information on a plurality of start logical addresses and a plurality of sizes for the plurality of first data units DU_1 and the plurality of second data units DU_2.

In various embodiments of the present disclosure, instead of receiving separate commands for the plurality of first data units DU_1 and the plurality of second data units DU_2, respectively, the controller 120 may determine a write pattern for the plurality of first data units DU_1 and the plurality of second data units DU_2 from the one or more write commands WR_CMD received before writing the first and second data units DU_1 and DU_2 to the memory 110.

Accordingly, overhead occurring in the process of writing the plurality of first data units DU_1 and the plurality of second data units DU_2 can be minimized.

In this case, each of the plurality of first data units DU_1 may correspond to at least one logical address area unit having a first size (e.g. 4 KB, 16 KB, 64 KB), and each of the plurality of second data units DU_2 may correspond to a plurality of logical address area units consecutive with each other. The plurality of logical address area units consecutive with each other may be expressed as a single integrated logical address area. The plurality of logical address area units consecutive with each other may be accessed sequentially by ascending or descending order.

For example, the first size may be the size of the above-described page. However, embodiments of the present disclosure are not limited thereto.

For example, each of the plurality of first data units DU_1 may be referred to as a random data unit, and each of the plurality of second data units DU_2 may be referred to as a sequential data unit.

Hereinafter, the plurality of first data units DU_1 and the plurality of second data units DU_2 according to an embodiment of the present disclosure will be described in detail with reference to FIG. 4.

Figure 4:
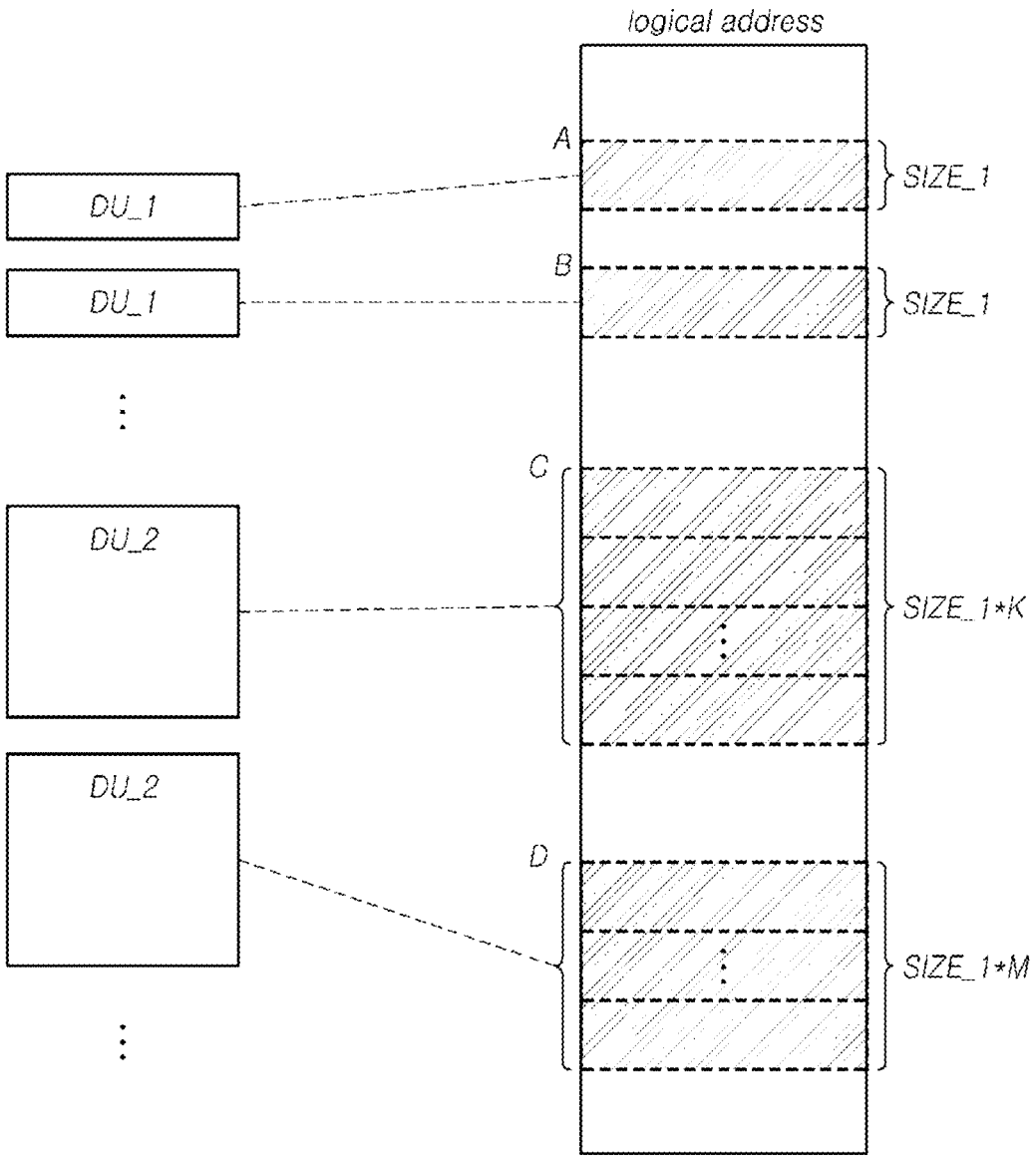
FIG. 4 is a diagram illustrating an example of a plurality of first data units and a plurality of second data units according to an embodiment of the present disclosure.

FIG. 4 is a diagram illustrating a plurality of first data units DU_1 and a plurality of second data units DU_2 according to an embodiment of the present disclosure.

In FIG. 4, start logical addresses respectively corresponding to the plurality of first data units DU_1 are denoted by A and B, and each of the plurality of first data units DU_1 may correspond to a logical address area unit having a first size SIZE_1.

Start logical addresses respectively corresponding to the plurality of second units DU_2 are denoted by C and D. A first one of the second data units DU_2 corresponding to the start logical address C may correspond to K (e.g., K is a natural number of 2 or more) consecutive logical address area units. A second one of the second data units DU_2 corresponding to the start logical address D may correspond to M (e.g., M is a natural number of 2 or more) consecutive logical address area units.

In some embodiments of the present disclosure, the storage device 100 may need to obtain a start logical address and a size of each of the plurality of first data units DU_1 and a start logical address and a size of each of the plurality of second data units DU_2 to write the plurality of first data units DU_1 and the plurality of second data units DU_2 to the memory 110.

The storage device 100 may obtain the start logical address and the size of each of the plurality of first data units DU_1 and the start logical address and the size of each of the plurality of second data units DU_2 to write the plurality of first data units DU_1 and the plurality of second data units DU_2 through one or more write commands WR_CMD.

Hereinafter, the one or more write commands WR_CMD according to embodiments of the present disclosure will be described in detail with reference to FIGS. 5 and 6.

Figure 5:
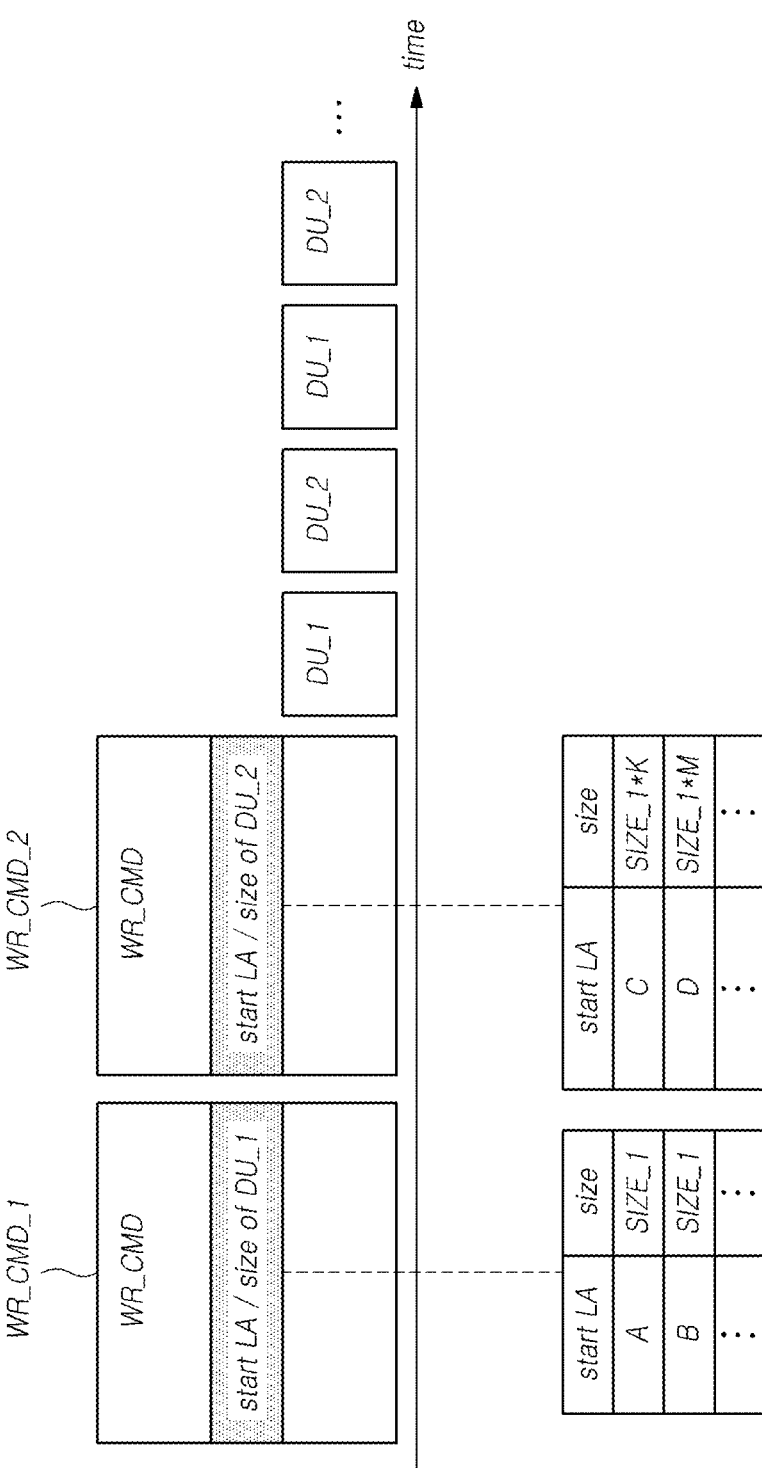
FIG. 5 is a diagram illustrating an example of a structure of write commands according to an embodiment of the present disclosure.

FIG. 5 is a diagram illustrating a structure of write commands WR_CMD according to an embodiment of the present disclosure.

Referring to FIG. 5, the number of write commands WR_CMD may be two.

In this case, a first write command WR_CMD_1, among the write commands WR_CMD, may include information on a start logical address and a size for each of the plurality of first data units DU_1. For example, the first write command WR_CMD_1 may indicate that start logical addresses of the plurality of first data units DU_1 are A, B, etc., and a size of each of the plurality of first data units DU_1 is a first size SIZE_1.

A second write command WR_CMD_2, among the write commands WR_CMD, may include information on a start logical address and a size for each of the plurality of second data units DU_2. For example, the second write command WR_CMD_2 may indicate that start logical addresses of the plurality of second data units DU_2 are C, D, etc., and sizes of the plurality of second data units DU_2 are K times the first size SIZE_1, M times the first size SIZE_1, etc.

Meanwhile, a flag, which indicates that the first write command WR_CMD_1 includes information about a start logical address and a size of each of the plurality of first data units DU_1 and that second write command WR_CMD_2 includes information about a start logical address and a size of each of the plurality of second data units DU_2, may be set in the first write command WR_CMD_1. For example, the flag may be set in the reserved area (e.g., a reserved field) of the first write command WR_CMD_1.

In FIG. 5, the case where the first write command WR_CMD_1 is transmitted to the storage device 100 before the second write command WR_CMD_2 has been described as an example. However, in embodiments of the present disclosure, there is no limit to the transmission order between the first write command WR_CMD_1 and the second write command WR_CMD_2. In some embodiments, the second write command WR_CMD_2 may be transmitted to the storage device 100 before the first write command WR_CMD_1.

Meanwhile, after the first write command WR_CMD_1 and the second write command WR_CMD_2 are transmitted, a plurality of first data units DU_1 and a plurality of second data units DU_2 may be transmitted to the storage device 100.

In this case, in embodiments of the present disclosure, there is no limit to the transmission order between the plurality of first data units DU_1 and the plurality of second data units DU_2. For example, the plurality of first data units DU_1 and the plurality of second data units DU_2 may be transmitted one by one. For example, the plurality of first data units DU_1 and the plurality of second data units DU_2 may be transmitted alternately. As another example, the plurality of first data units DU_1 may be transmitted first and the plurality of second data units DU_2 may be transmitted later. As another example, the plurality of second data units DU_2 may be transmitted first and the plurality of first data units DU_1 may be transmitted later.

Figure 6:
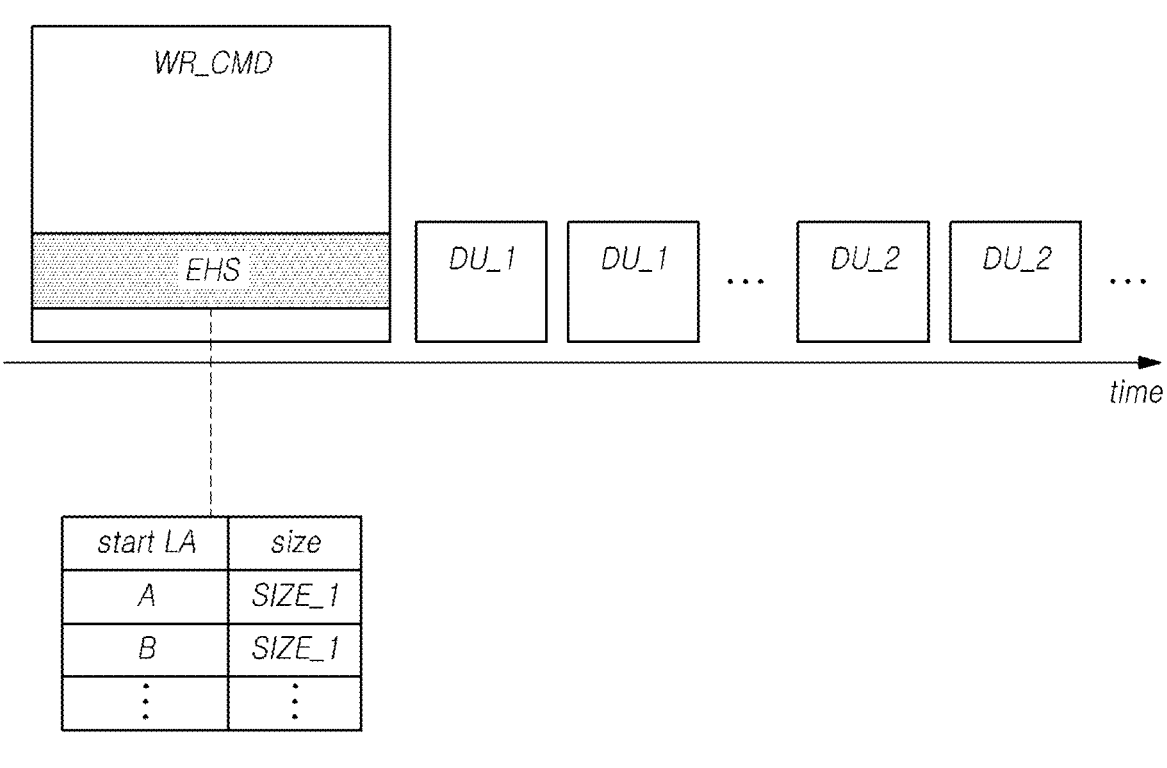
FIG. 6 is a diagram illustrating another example of a structure of write commands according to an embodiment of the present disclosure.

FIG. 6 is a diagram illustrating a structure of a write command according to an embodiment of the present disclosure.

Referring to FIG. 6, the number of write command WR_CMD may be one.

In this case, the write command WR_CMD may include an extended header segment EHS indicating a start logical address and a size of each of the plurality of first data units DU_1 and a start logical address and a size of each of the plurality of second data units DU_2.

The write command WR_CMD may include a Universal Flash Storage (UFS) Protocol Information Unit (hereinafter, referred to as "UPIU") frame header. In this case, the UPIU frame header may include a full length field of the extended header segment EHS, and the full length field of the extended header segment EHS may indicate that the length of the extended header segment EHS is not 0. Meanwhile, the extended header segment EHS may be referred to as an extra header segment.

In FIG. 6, the extended header segment EHS may indicate that start logical addresses of the plurality of first data units DU_1 are A, B, etc., and the size of each of the plurality of first data units DU_1 is the first size SIZE_1.

The extended header segment EHS may also indicate that start logical addresses of the plurality of second data units DU_2 are C, D, etc., and sizes of the plurality of second data units DU_2 are K times the first size SIZE_1, M times the first size SIZE_1, etc.

Meanwhile, after the write command WR_CMD is transmitted, the plurality of first data units DU_1 and the plurality of second data units DU_2 may be transmitted to the storage device 100. Similarly to the embodiment of FIG. 5, there is no limit to the transmission order between the plurality of first data units DU_1 and the plurality of second data units DU_2. Compared to the embodiment of FIG. 5 that receives two write commands WR_CMD_1 and WR_CMD_2 before receiving the first and second data units DU_1 and DU2, the embodiment of FIG. 6 receives a single write command WR_CMD before receiving the first and second data units DU_1 and DU2.

Hereinafter, an example of the order in which the storage device 100 writes the plurality of first data units DU_1 and the plurality of second data units DU_2 will be described.

Figure 7:
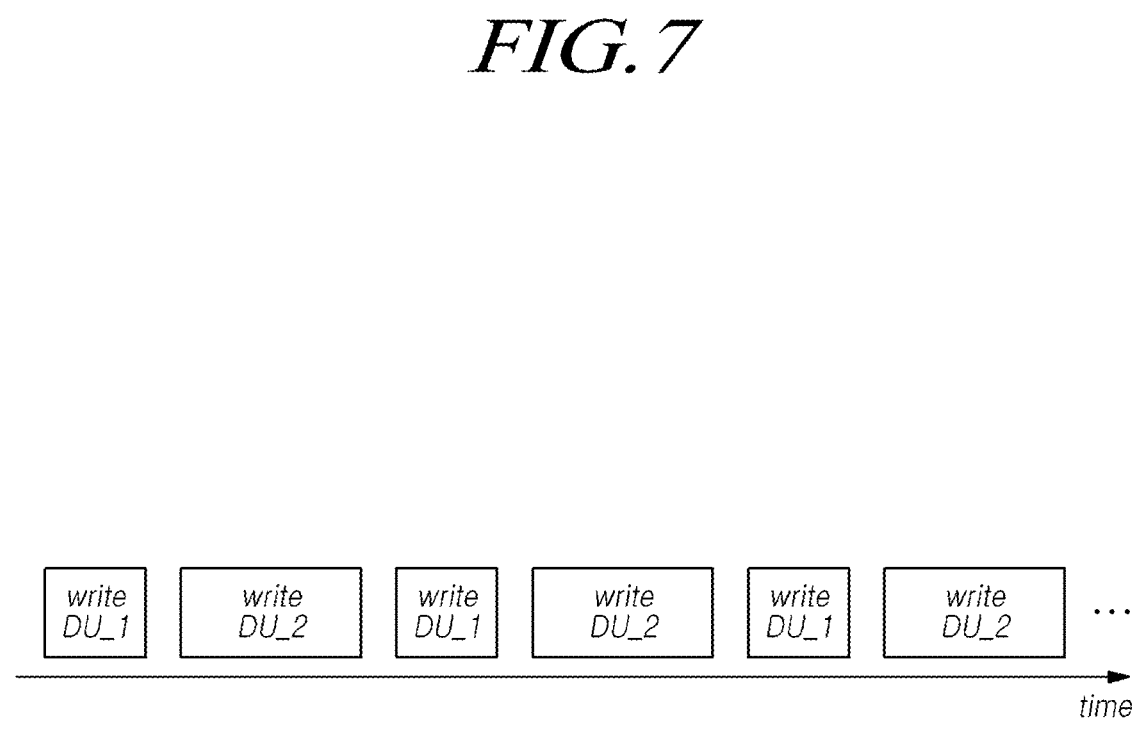

FIG. 7 is a diagram illustrating an order in which a plurality of first data units DU_1 and a plurality of second data units DU_2 are written, according to an embodiment of the present disclosure.

Referring to FIG. 7, the controller 120 of the storage device 100 may alternately write one of the plurality of first data units DU_1 and one of the plurality of second data units DU_2.

That is, the write operation may be performed in the following order: a first one of the first data units DU_1, a first one of the second data units DU_2, a second one of the first data units DU_1, a second one of the second data units DU_2, and so on. In FIG. 7, the controller 120 may write a specific first data unit first and then write a second data unit corresponding to the first data unit. Specifically, the controller 120 may write the first one of the first data units DU_1 and then write the first one of the second data units DU_2, write the second one of the first data units DU_1 and then write the second one of the second data units DU_2, and so on.

In an embodiment, each of the plurality of first data units DU_1 may be metadata of a file system of the host HOST, and each of the plurality of second data units DU_2 may be user data corresponding to the metadata. For example, the first one of the first data units DU_1 may be metadata corresponding to the first one (e.g., user data) of the second data units DU_2, the second one of the first data units DU_1 may be metadata corresponding to the second one (e.g., user data) of the second data units DU_2, and so on.

Meanwhile, the storage device 100 may determine whether to suspend the write operation while writing the plurality of first data units DU_1 and the plurality of second data units DU_2. Hereinafter, details will be described with reference to FIG. 8.

Figure 8:
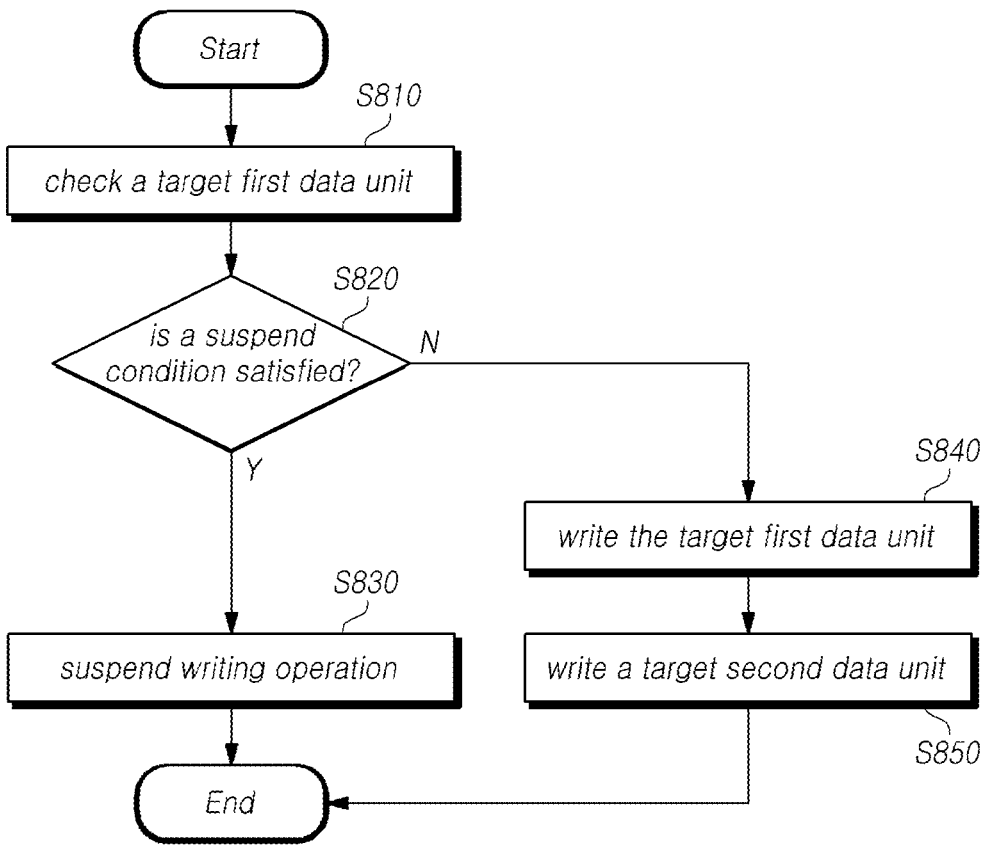
FIG. 8 is a diagram illustrating an example of an operation in which a storage device determines whether to suspend write operation according to an embodiment of the present disclosure.

FIG. 8 is a diagram illustrating an operation in which a storage device (e.g., the storage device 100 in FIG. 3) determines whether to suspend write operation according to an embodiment of the present disclosure.

Referring to FIG. 8, the controller 120 of the storage device 100 may check a target first data unit among the plurality of first data units DU_1 (S810).

The controller 120 may determine whether the target first data unit satisfies a given (e.g., set) suspend condition (S820).

When it is determined that the target first data unit satisfies the suspend condition (S820-Y), the controller 120 may suspend writing at least a part of the plurality of first data units DU_1 and the plurality of second data units DU_2 to the memory 110 (S830).

In this case, data units that have not yet been written to the memory 110 among the plurality of first data units DU_1 and the plurality of second data units DU_2 are not written to the memory 110. For example, when the controller 120 determines that the target first data unit satisfies the suspend condition, the controller 120 may suspend writing the target first data unit and a part of the first and second data units DU_1 and DU_2 subsequent to the target first data unit.

However, among the plurality of first data units DU_1 and the plurality of second data units DU_2, data units that have already been written to the memory 110 may be maintained in the memory 110.

Meanwhile, when it is determined that the target first data unit does not satisfy the suspend condition (S820-N), the controller 120 may write the target first data unit to the memory 110 (S840), and write a target second data unit corresponding to the target first data unit among the plurality of second data units DU_2 to the memory 110 (S850).

Hereinafter, an example of a specific operation performed by the controller 120 at S820 will be described with reference to FIG. 9.

Figure 9:
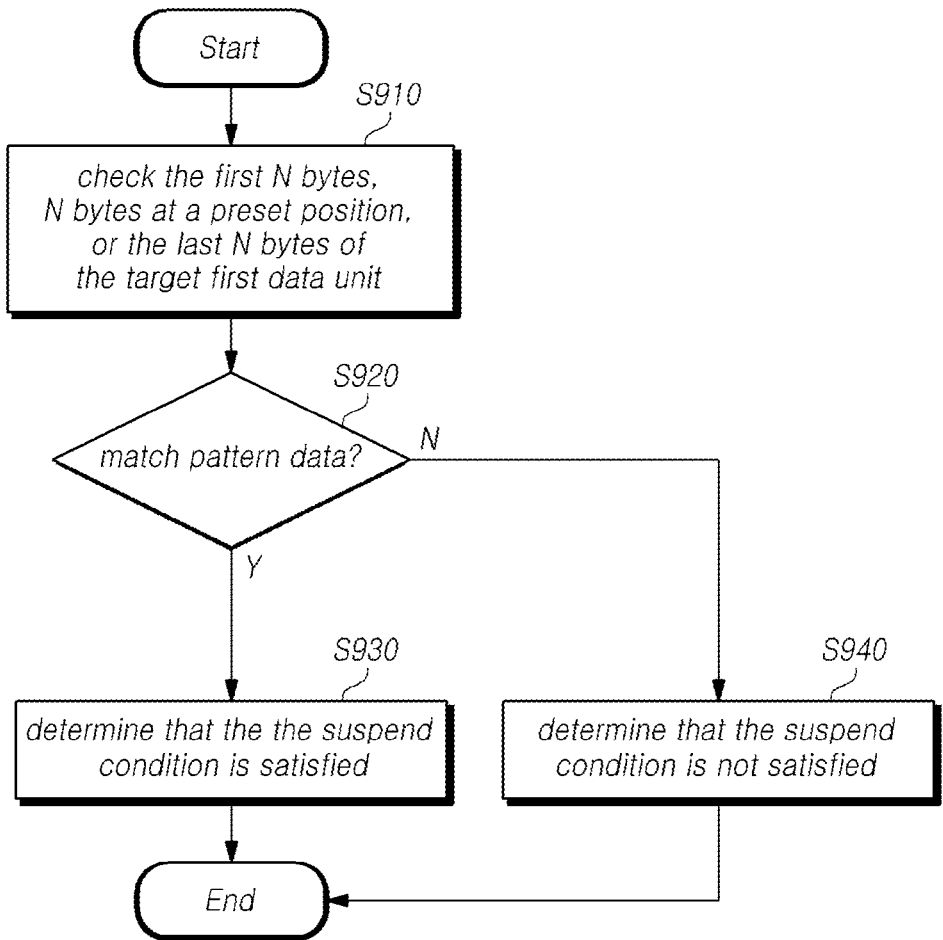
FIG. 9 is a diagram illustrating an example of an operation in which a storage device determines whether a suspend condition has been satisfied according to an embodiment of the present disclosure.

FIG. 9 is a diagram illustrating an operation in which a storage device (e.g., the storage device 100 in FIG. 3) determines whether a suspend condition has been satisfied according to an embodiment of the present disclosure.

Referring to FIG. 9, the controller 120 of the storage device 100 may check any one of the first N (N is a natural number) bytes, N bytes at a preset position, and the last N bytes of the target first data unit (S910). For example, the N-bytes at a preset position may be N-bytes at any position other than the first N bytes and the last N bytes of the target first data unit.

The controller 120 may determine whether any one of the first N bytes, N bytes at a preset position, and the last N bytes of the target first data unit matches given (e.g., predetermined) N byte pattern data (S920).

In this case, the pattern data may be determined in various ways.

For example, the controller 120 may receive the pattern data from the host HOST through the write command WR_CMD described above.

The host HOST may indicate the pattern data in various ways. For example, the pattern data may be included in the extended header segment EHS of the write command WR_CMD described above.

As another example, the pattern data may be predetermined data. Specifically, the predetermined pattern data may be stored in the storage device 100 before receiving one or more write commands WR_CMD from the host HOST.

When any one of the first N bytes, N bytes at a preset position, and the last N bytes of the target first data unit matches the pattern data (S920-Y), the controller 120 may determine that the target first data unit satisfies the suspend condition (S930).

Meanwhile, when any one of the first N bytes, N bytes at a preset position, and the last N bytes of the target first data unit does not match the pattern data (S920-N), the controller 120 may determine that the suspend condition is not satisfied (S940).

Figure 10:
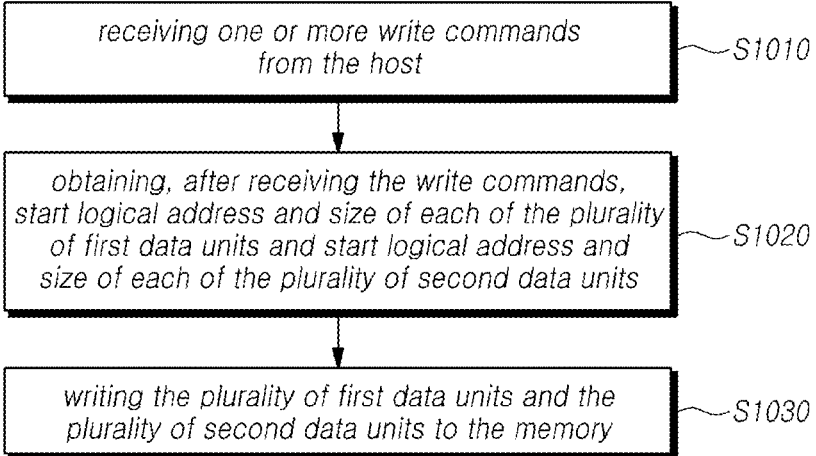
FIG. 10 is a diagram illustrating an operating method of a storage device according to an embodiment of the present disclosure.

FIG. 10 is a diagram illustrating an operating method of a storage device (e.g., the storage device 100 in FIG. 3) according to an embodiment of the present disclosure.

Referring to FIG. 10, the operating method of the storage device 100 may include receiving, from a host (e.g., the host HOST in FIG. 3), one or more write commands WR_CMD requesting to write the plurality of first data units DU_1 and the plurality of second data units DU_2 (S1010). In an embodiment, a controller (e.g., the controller 120 in FIG. 3) may receive, from a host, one or more write commands WR_CMD for writing the plurality of first data units DU_1 and the plurality of second data units DU_2 (S1010).

In this case, each of the plurality of first data units DU_1 may correspond to at least one logical address area unit having the first size SIZE_1, and each of the plurality of second data units DU_2 may correspond to each of a plurality of logical address area units consecutive with each other.

The operating method of the storage device 100 may include obtaining, after receiving the write commands WR_CMD, a logical address and a size of each of the plurality of first data units DU_1 and a start logical address and a size of each of the plurality of second data units DU_2 from the write commands (S1020). In an embodiment, the controller 120 may obtain a start logical address and a size of each of the plurality of first data units DU_1 and a start logical address and a size of each of the plurality of second data units DU_2 from the write commands WR_CMD.

For example, the number of write commands WR_CMD may be two. In this case, the controller 120 may receive a first write command WR_CMD_1 and a second command WR_CMD_2 as the write commands WR_CMD. The first write command WR_CMD_1 may include information on a start logical address and a size for each of the plurality of first data units DU_1, and the second write command WR_CMD_2 may include information on a start logical address and a size for each of the plurality of second data units DU_2.

At this time, the first write command WR_CMD_1 may include a flag indicating the first write command WR_CMD_1 includes information about a start logical address and a size of each of the plurality of first data units DU_1 and the second write command WR_CMD_2 includes information about a start logical address and a size of each of the plurality of second data units DU_2.

As another example, the number of write command WR_CMD may be one. In this case, the controller 120 may receive a single write command WR_CMD. The single write command WR_CMD may include the extended header segment EHS indicating a start logical address and a size of each of the plurality of first data units DU_1 and a start logical address and a size of each of the plurality of second data units DU_2.

The operating method of the storage device 100 may include writing the plurality of first data units DU_1 and the plurality of second data units DU_2 to the memory 110 (S1030). In an embodiment, the controller 120 may write at least a part of the plurality of first data units DU_1 and the plurality of second data units DU_2 to the memory 110 based on the start logical address and the size of each of the plurality of first data units DU_1 and the start logical address and the size of each of the plurality of second data units DU_2.

In an embodiment, at S1030, one of the plurality of first data units DU_1 and one of the plurality of second data units DU_2 may be written alternately.

Meanwhile, S1030 may include determining whether a target first data unit among the plurality of first data units DU_1 satisfies the suspend condition. When it is determined that the target first data unit satisfies the suspend condition, the controller 120 may suspend writing at least a part of the plurality of first data units DU_1 and the plurality of second data units DU_2 to the memory 110. When it is determined that the target first data unit does not satisfy the suspend condition, the controller 120 may write the target first data unit to the memory 110 and a target second data unit corresponding to the target first data unit among the plurality of second data units DU_2 to the memory 110.

In determining whether the target first data unit satisfies the suspend condition, the controller 120 may determine that the target first data unit satisfies the suspend condition when N bytes in the target first data unit matches pattern data of N bytes. For example, the controller 120 may determine that the target first data unit satisfies the suspend condition when any one of the first N (N is a natural number) bytes, N bytes at a preset position (e.g., a position other than the first and last N bytes), and the last N bytes of the target first data unit matches the N bytes of pattern data.

Although some embodiments of the disclosure have been described for illustrative purposes, those skilled in the art will appreciate that various modifications, additions and substitutions are possible. The scope of embodiments of the disclosure should be interpreted in connection with the appended claims and encompass all equivalents falling within the scope of the appended claims.

What is claimed is:

1. A storage device comprising:
a memory configured to store a plurality of data units; and
a controller configured to:
receive, from a host, one or more write commands for writing a plurality of first data units and a plurality of second data units;
obtain a start logical address and a size of each of the plurality of first data units and a start logical address and a size of each of the plurality of second data units from the one or more write commands; and
write at least a part of the plurality of first data units and the plurality of second data units to the memory based on the start logical address and the size of each of the plurality of first data units and the start logical address and the size of each of the plurality of second data units,
wherein each of the plurality of first data units corresponds to at least one logical address area unit having a first size, and each of the plurality of second data units corresponds to a plurality of logical address area units consecutive with each other.

2. The storage device according to claim 1, wherein the controller is further configured to write all of the plurality of first data units and the plurality of second data units to the memory.

3. The storage device according to claim 1, wherein the controller receives a first write command and a second write command as the write commands,
wherein the first write command includes information on the start logical address and the size for each of the plurality of first data units, and
wherein the second write command includes information on the start logical address and the size for each of the plurality of second data units.

4. The storage device according to claim 3, wherein the first write command further includes a flag indicating that the first write command includes information about the start logical address and the size of each of the plurality of first data units and that the second write command includes information about the start logical address and the size of each of the plurality of second data units.

5. The storage device according to claim 1, wherein the controller receives a single write command as the one or more write commands, and wherein the single write command includes an extended header segment indicating the start logical address and the size of each of the plurality of first data units and the start logical address and the size of each of the plurality of second data units.

6. The storage device according to claim 1, wherein the controller is further configured to alternately write one of the plurality of first data units and one of the plurality of second data units.

7. The storage device according to claim 6, wherein each of the plurality of first data unit is metadata of a file system of the host, and wherein each of the plurality of second data unit is user data corresponding to the metadata.

8. The storage device according to claim 6, wherein the controller is further configured to:

determine whether a target first data unit among the plurality of first data units satisfies a suspend condition;

when it is determined that the target first data unit satisfies the suspend condition, suspend writing the target first data and a part of the plurality of first data units and the plurality of second data units subsequent to the target first data to the memory; and when it is determined that the target first data unit does not satisfy the suspend condition, write the target first data unit to the memory and write a target second data unit corresponding to the target first data unit among the plurality of second data units to the memory.

9. The storage device according to claim 8, wherein the controller is further configured to determine that the target first data unit satisfies the suspend condition when N bytes in the target first data unit matches pattern data of N bytes, and Wherein N is a natural number.

10. The storage device according to claim 9, wherein the controller is further configured to receive the pattern data from the host through the one or more write commands.

11. The storage device according to claim 1, wherein the controller is further configured to calculate the start logical address and the size of each of the plurality of first data units based on a start logical address and a size of a first one of the first data units, and calculate the start logical address and the size of each of the plurality of second data units based on a start logical address and a size of a first one of the second data units.

12. An operating method of a storage device, comprising:

receiving, from a host, one or more write commands for writing a plurality of first data units and a plurality of second data units;

obtaining a start logical address and a size of each of the plurality of first data units and a start logical address and a size of each of the plurality of second data units from the one or more write commands; and writing at least a part of the plurality of first data units and the plurality of second data units to the memory, wherein each of the plurality of first data units corresponds to at least one logical address area unit having a first size, and each of the plurality of second data units corresponds to a plurality of logical address area units consecutive with each other.

13. The method according to claim 12, wherein a first write command and a second write commands are received as the write commands, wherein the first write command includes information on the start logical address and the size of each of the plurality of first data units, and wherein the second write command includes information on the start logical address and the size of each of the plurality of second data units.

14. The method according to claim 13, wherein the first write command further includes a flag indicating that the first write command includes information about the start logical address and the size of each of the plurality of first data units and that the second write command includes information about the start logical address and the size of each of the plurality of second data units.

15. The method according to claim 12, wherein a single write command is received as the one or more write commands, and wherein the single write command includes an extended header segment indicating the start logical address and the size of each of the plurality of first data units and the start logical address and the size of each of the plurality of second data units.

16. The method according to claim 12, wherein the writing comprises alternately writing one of the plurality of first data units and one of the plurality of second data units.

17. The method according to claim 16, wherein the writing comprises:

determining whether a target first data unit among the plurality of first data units satisfies a suspend condition; and when it is determined that the target first data unit satisfies the suspend condition, suspending writing the target first data and a part of the plurality of first data units and the plurality of second data units subsequent to the target first data to the memory; and when it is determined that the target first data unit does not satisfy the suspend condition, writing the target first data unit to the memory and write a target second data unit corresponding to the target first data unit among the plurality of second data units to the memory.

18. The method according to claim 17, wherein the target first data unit is determined to satisfy the suspend condition when N bytes in the target first data unit matches pattern data of N bytes, and wherein N is a natural number.

* * * * *